United States Patent
Williams et al.

(10) Patent No.: US 9,044,901 B2
(45) Date of Patent: Jun. 2, 2015

(54) REMOVABLE PROFILE ASSEMBLY AND METHOD OF USE

(75) Inventors: Arthur F. Williams, Rockfall, CT (US); Paul H. Stevens, Burlington, CT (US)

(73) Assignee: HABASIT AMERICA, INC., Middleton, CT (US)

( * ) Notice: Subject to any disclaimer, the term of this patent is extended or adjusted under 35 U.S.C. 154(b) by 512 days.

(21) Appl. No.: 13/470,404

(22) Filed: May 14, 2012

(65) Prior Publication Data

US 2013/0298372 A1     Nov. 14, 2013

(51) Int. Cl.
| | |
|---|---|
| *B65G 15/58* | (2006.01) |
| *B65G 17/12* | (2006.01) |
| *B29C 65/58* | (2006.01) |
| *B65G 17/32* | (2006.01) |
| *B65G 17/46* | (2006.01) |
| *B29C 65/00* | (2006.01) |
| *B29C 65/08* | (2006.01) |
| *B29C 65/10* | (2006.01) |
| *B29C 65/16* | (2006.01) |
| *B29C 65/06* | (2006.01) |
| *B29C 65/48* | (2006.01) |
| *B29C 65/76* | (2006.01) |
| *B29C 65/18* | (2006.01) |
| *B29L 31/00* | (2006.01) |
| *B29C 65/02* | (2006.01) |

(52) U.S. Cl.
CPC .......... *B29C 65/58* (2013.01); *Y10T 29/49817* (2015.01); *Y10T 29/49876* (2015.01); *B65G 17/32* (2013.01); *B65G 17/12* (2013.01); *B65G 15/58* (2013.01); *B65G 17/46* (2013.01); *B29C 65/08* (2013.01); *B29C 65/10* (2013.01); *B29C 65/16* (2013.01); *B29C 66/7392* (2013.01); *B29C 65/06* (2013.01); *B29C 65/4895* (2013.01); *B29C 65/76* (2013.01); *B29C 66/474* (2013.01); *B29C 65/0672* (2013.01); *B29C 65/18* (2013.01); *B29L 2031/7092* (2013.01); *B29C 65/02* (2013.01)

(58) Field of Classification Search
CPC ........ B65G 15/58; B65G 17/12; B65G 17/14; B65G 17/32; B65G 19/24; B65G 2207/38; B65G 2812/02613; B65G 2812/02683
USPC ................. 198/465.1, 465.2, 867.01, 867.09, 198/867.15, 487.1, 962, 693, 803.12, 698, 198/699, 699.1, 731

See application file for complete search history.

(56) References Cited

U.S. PATENT DOCUMENTS

| | | | | |
|---|---|---|---|---|
| 4,582,193 | A * | 4/1986 | Larsson .................. | 198/867.15 |
| 5,000,311 | A * | 3/1991 | Abbestam et al. ....... | 198/867.14 |
| 5,337,887 | A * | 8/1994 | Greenwell et al. ....... | 198/867.14 |
| 6,321,904 | B1 * | 11/2001 | Mitchell .................. | 198/867.11 |
| 6,415,905 | B1 | 7/2002 | Sundermeier et al. | |

(Continued)

*Primary Examiner* — Mark A Deuble
(74) *Attorney, Agent, or Firm* — Cantor Colburn LLP

(57) ABSTRACT

A profile assembly for use on a belt comprises a base configured to be attached to the belt, wherein the base comprises a lower portion configured to be in physical communication with a surface of the belt, and an upper portion comprising aperture channel therein, and a lip disposed adjacent to the channel on a side of the upper portion; and a removable profile configured to matingly engage the base, wherein the profile comprises an outer portion configured to be in physical communication with an object to be conveyed, and an inner portion configured to be inserted into the upper portion, wherein the inner portion comprises a protrusion extending from a first surface of the inner portion, the protrusion configured to extend through the aperture and snap fit with the lip.

20 Claims, 3 Drawing Sheets

(56) References Cited

U.S. PATENT DOCUMENTS

| | | |
|---|---|---|
| 6,476,698 B1 | 11/2002 | Anand et al. |
| 6,491,157 B1 | 12/2002 | Kölling et al. |
| 6,766,901 B2 | 7/2004 | Guldenfels et al. |
| 7,500,552 B2 | 3/2009 | Switzeny |
| 7,971,707 B2 | 7/2011 | Elsner |
| 8,016,103 B2 * | 9/2011 | Krischer ............ 198/853 |
| 2006/0151304 A1 * | 7/2006 | Ozaki et al. ............ 198/853 |
| 2006/0237287 A1 * | 10/2006 | Fochler ............ 198/699.1 |
| 2007/0158163 A1 * | 7/2007 | Kritzinger et al. ........ 198/397.06 |
| 2010/0236898 A1 | 9/2010 | Nakamura et al. |
| 2013/0186735 A1 * | 7/2013 | Umeda ............ 198/890 |

\* cited by examiner

REMOVABLE PROFILE ASSEMBLY AND METHOD OF USE

BACKGROUND

The present disclosure generally relates to a belt profile for mounting on a toothed belt and methods for using the profile. More particularly, the present disclosure relates to a profile assembly wherein the profile is quickly removable from the toothed belt.

In many industrial applications, conveyor systems are used to carry products along desired pathways. In general, in belt conveying, a profile is attached to a toothed belt, such as a timing belt, for press feeding a conveyed object in the conveying direction. The profile is typically attached to the top "convey-side" surface of the belt, opposite the toothed-side. In many cases, the profile is fixedly attached to the top surface of the belt by welding or bonding with an adhesive, and in some cases the belt and profiles are integrally molded. In other instances, bolts and/or screws have been utilized to attach the profile to the belt.

Profiles can wear and/or break over time due to friction with the product over many cycles. Worn or broken profiles can impact conveyance of the product resulting in jams, loss of product, reduced efficiency, and the like. Due to the current methods for attaching the profiles to the belt, the profile cannot be readily detached and replaced. Rather, the entire belt must be removed from the conveyor system and the worn profile can then be replaced, or in some cases, the entire belt must be replaced. Removing the belt can require significant labor and results in system downtime and potentially unnecessary replacement part costs.

Accordingly, there is a need for an improved profile design that is economical, easy to install and remove, and that prevents the entire toothed belt from having to be removed or replaced for a single worn or damaged profile.

BRIEF SUMMARY

Disclosed herein are belt profile assemblies and methods for replacing a removable profile on a belt. In one embodiment, a profile assembly for use on a belt, comprises a base configured to be attached to the belt, wherein the base comprises a housing comprising a channel formed in an upper surface, a lip at about a selected end of the housing defining a sidewall opening, and a bottom surface configured to be in physical communication with a surface of the belt; and a removable profile comprising an upper portion configured to be in physical communication with an object to be conveyed, and a lower portion configured to be inserted into the channel, wherein the lower portion comprises an outwardly extending first protrusion configured to snap fit with the base lip when the profile is inserted into the channel.

In another embodiment, a profile assembly for conveying an object comprises a base configured to be welded to an outside surface of a timing belt, wherein the base comprises a channel disposed in an upper surface, a lip disposed about one end of the channel to define a sidewall opening in the housing, and a bottom surface adapted for in physical communication with the outside surface of the timing belt; and a removable profile comprising an upper portion configured to be in physical communication with the object to be conveyed, and a lower portion configured to be inserted into the channel of the base housing, wherein the lower portion comprises a first and second protrusions extending therefrom on opposite surfaces, wherein a selected one of the first and second protrusions is configured to snap fit with the lip when the profile is inserted into the channel.

A method of providing a profile assembly for a belt comprises providing a profile assembly comprising a base and a removable profile; plastic welding the base onto an outside surface of the belt, wherein the base comprises a lower portion configured to be in physical communication with a surface of the belt, and an upper portion comprising an aperture therein, and a lip disposed adjacent to the aperture on a side of the upper portion; and snap fitting the profile top into the base by inserting an inner portion of the profile top into the upper portion, wherein the inner portion comprises a protrusion extending from a surface of the inner portion, the protrusion configured to extend through the aperture and snap fit with the lip, and wherein the profile top comprises an outer portion configured to be in physical communication with an object to be conveyed.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

Figure ("FIG.") 1 schematically illustrates a removable profile assembly in accordance with an embodiment of the present disclosure.

DETAILED DESCRIPTION

The removable profile assemblies described herein include a profile removably attached to a base, wherein the base is attached to or is configured as a movable belt, such as may be employed with a timing belt in a conveyor system. The belt profile can be removed from the belt individually and without the need to remove the entire belt from the conveyor. In some embodiments, when only a portion of the profile is worn from use, the profile can be removed from the belt and reinstalled in a reverse position, such that an opposite, unworn surface will be in contact with the product to be conveyed. Again, this can be done without the need to remove the entire toothed belt from the system and without the need to remove the base from the belt, thereby saving on downtime and labor and materials costs compared to current belted profiles that require complete removal or even replacement of the belt in order to replace a worn or damaged profile.

Figure 1:
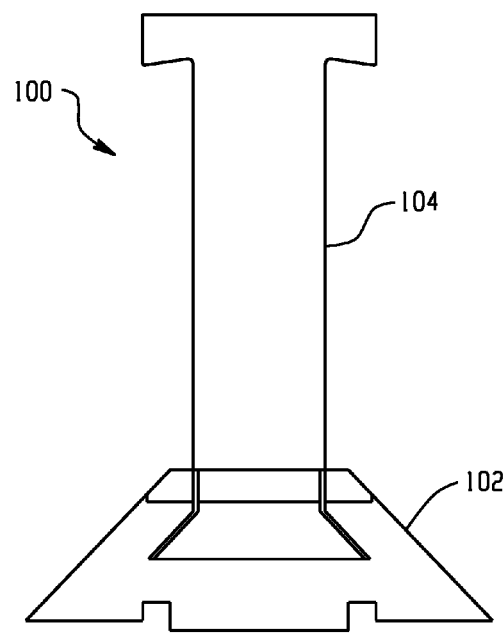

Turning now to FIG. 1, an exemplary embodiment of a removable profile assembly 100 is schematically illustrated. The removable profile assembly 100 comprises a base 102 and a removable profile 104. The base 102 and profile 104 are two separate parts that may be mated together to form the removable profile assembly 100. The profile assembly 100 is configured to be attached to a belt of a conveyor system. The belt can also be referred to as a timing belt, conveyor belt, profile belt, and the like. Together with the belt, the profile assembly 100 is configured to convey a product in the desired direction.

The base 102 is in physical communication with the belt and is attached thereto. The base 102 can be attached to the belt by any means known in the art. In an exemplary embodiment, the base 102 is plastic welded to the belt. Exemplary methods of plastic welding can include, without limitation, hot gas, heat seal, freehand, speed tip, contact, hot plate, high frequency, ultrasonic, friction, spin, laser, solvent, and other like welding techniques. As indicated by the attachment technique, the exemplary base 102 is formed of a thermoplastic material. Exemplary thermoplastic materials for the base 102 can include, without limitation, polyurethanes, polyesters, polyamides, polyolefin blends, styrenic block copolymers, elastomeric alloys, and the like.

Figure 2:
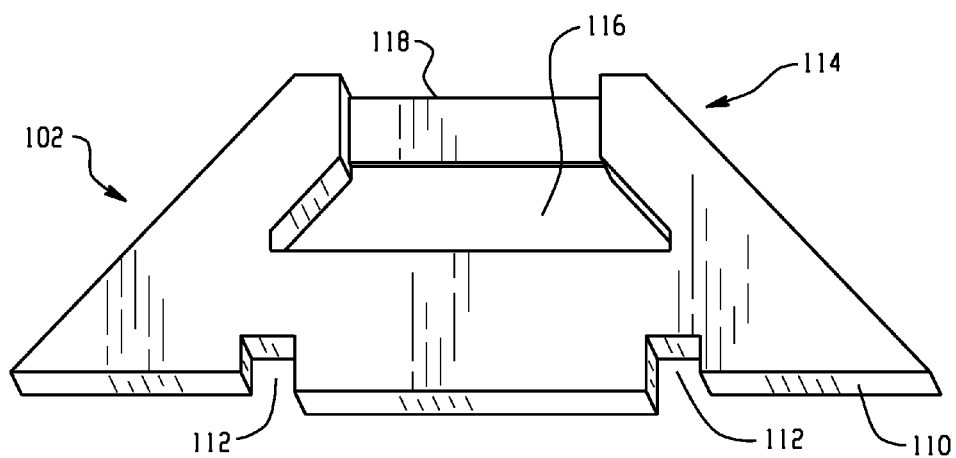
FIG. 2 schematically illustrates a profile base from the removable profile assembly of FIG. 1, in accordance with an embodiment of the present disclosure.

Turning now to FIG. 2, the base 102 is schematically illustrated separate from the profile 104, in order to better view the features the base. The base 102 generally has a shape configured to adequately secure the profile assembly 100 to the belt and permit the profile top 104 to be removably disposed within the base 102. The base 102 can have any shape suitable for securing the profile assembly 100 to the belt and providing access for the profile top 104 to removably engage the base 102. In an exemplary embodiment, the base 102 has a generally trapezoidal shaped housing 114 extending from a bottom surface generally depicted by reference numeral 110, which can be fixedly attached to the belt as previously described. The bottom surface 110 may further include notches 112 to aid in securing the base 102 to the belt. In one embodiment, the bottom surface 110 is configured to have approximately the same width as the width of the belt. In another embodiment, the bottom surface 110 is configured to have a width that is narrower than a width of the belt. Moreover, the base 102 can be disposed in a center portion of the belt width or it can be offset to one side or the other. Further, the base 102 can be disposed parallel to the direction of belt movement or it can be disposed perpendicular thereto.

The base housing 114 includes a channel 116 extending along a length of the housing 114. A lip 118 is disposed at about a selected end of the channel to define a sidewall opening at one end of the housing 114. The channel 116 is shown with a trapezoidal shape so as to retain a complementary shaped lower portion of the profile top when inserted therein. As will be described in greater detail below, the shape of the channel 116 is not intended to be limited so long as it is generally complementary to a lower portion 102 of the profile top 104 and is generally configured to prevent axial movement of the profile 104 when inserted into the channel 116. Engagement of the profile top 114 with the lip 118 permits the profile top 104 to removably snap fit into the base 102, thereby completing the profile assembly 100.

Figure 3:
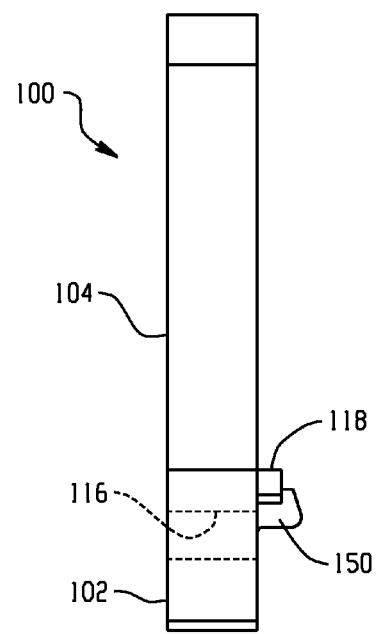
FIG. 3 schematically illustrates a side view of the removable profile assembly of FIG. 1.

FIG. 3 is a side view of the profile assembly 100. This perspective illustrates the lip 118 disposed above the channel 116 on the housing 114 of the base 102. In one embodiment, the lip 118 extends from a side of the base 102 at a distance configured to engage a protrusion 150 of the profile 104, such that the profile becomes attached to the base 102 when the protrusion 150 extends beyond and physically engages the lip 118.

Figure 4:
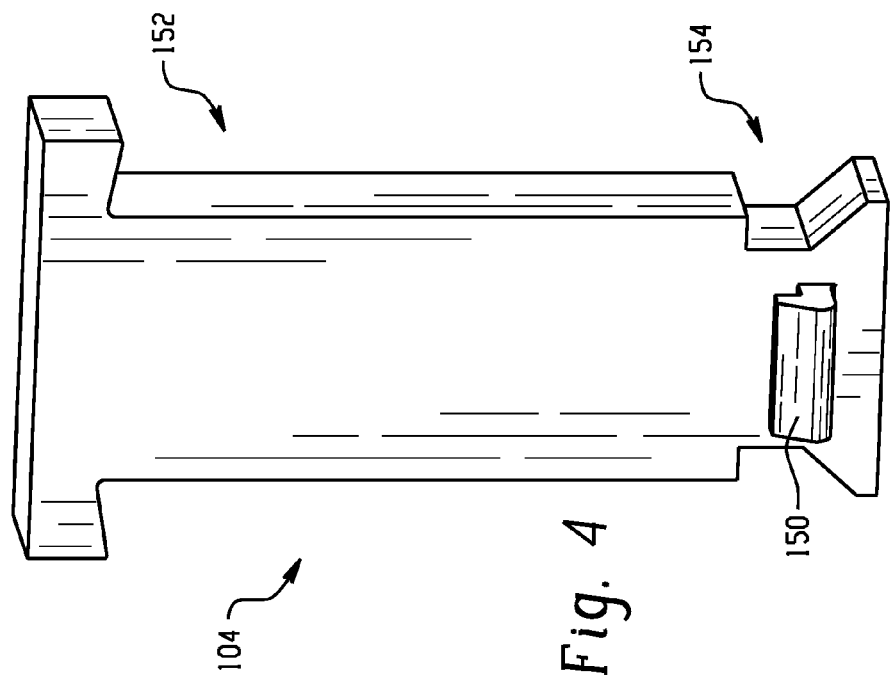
FIG. 4 schematically illustrates a profile top from the removable profile assembly of FIG. 1, in accordance with an embodiment of the present disclosure.

The profile 104 is configured to be in physical communication with the product, i.e., object, to be conveyed. Advancement of the belt upon which the profile assembly 100 is attached moves the profile 104 into contact with the product and conveys it in the desired direction. As schematically illustrated in FIG. 4, the profile 104 generally has an upper portion 152 and a lower portion 154. The upper portion 152 is configured to be in physical communication with the product and will have a shape appropriate for conveying the unique outline of the product. A person skilled in the art is readily capable of configuring the shape of the outer portion for effectively conveying the desired product. The particular embodiment of the upper portion 152 in FIG. 4 has a "T-shape," but it is to be understood virtually any shape can be envisioned and will depend on, for example, the application of the conveyor system.

Regardless of the general shape of the upper portion 152, the lower portion 154 of the profile 104 is configured to be inserted into and matingly engage the channel 118 of the base 102. As such, the lower portion 154 has a generally complementary shape that corresponds to the shape of the channel 116 of the base 102. As shown, the lower portion 154 has a trapezoidal shape that is complementary to the trapezoidal shaped opening of the channel 116. In another embodiment, the base 102 may have another shape and, as such, the lower portion 154 of the profile top 104 would have a shape that corresponds thereto, such that the profile can be inserted into the base. In some embodiments, the upper portion 152 has a width that is generally greater than the lower portion 154, such that the upper portion 152 extends over the housing 114 of the base 102 adding to the stability of the profile assembly when in contact with the product. The lower portion 154 further comprises the protrusion 150, which extends therefrom. As previously mentioned, the protrusion 150 is configured to pass through the channel 116 of the base 102 and engage the lip 118 to effectively lock the profile into a fixed position In one embodiment, the protrusion 150 has an "L-shape" for locking the profile top in position. The protrusion 150 extends outward from the lower portion 154 in a generally parallel direction (with respect to the base 102) and the upper portion of the protrusion 150 is at a generally ninety-degree angle, giving protrusion 150 the L-shape appearance.

When the lower portion 152 of the profile 104 is inserted into the channel 116 of the base 102, the L-shape of the protrusion 150 is able to pass through the channel 116 and is at a height that engages lip 118. To remove the profile 104, such as to replace it or reverse it to another side of the conveyor, the protrusion 150 can be depressed until it disengages the lip 118 and the profile 104 can be slidingly removed from the channel of the base 102. The profile 104, therefore, is configured to slidingly engage the channel and snap fit into the base 102. As used herein, the term snap fit is well known and is generally intended to refer to the secure, yet removable mating engagement of the profile 104 into the base 102, as described herein. The "snap" or sometimes audible "click" that occurs when mating the profile 104 with the base 102 comes from the protrusion 150 engaging the lip 118 of the base 102.

Figure 6A:
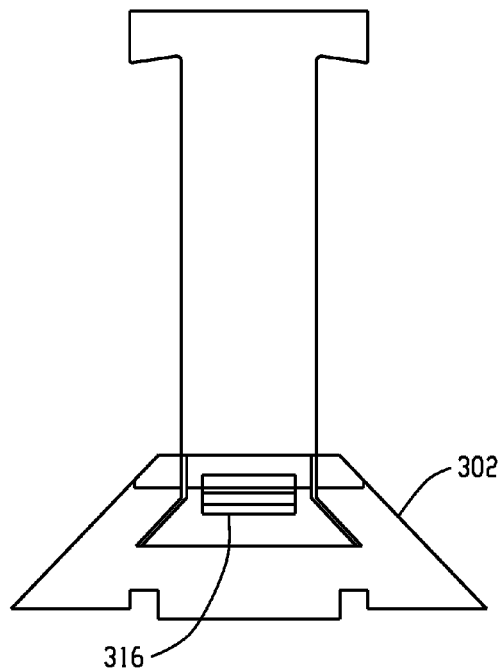
FIG. 6A schematically illustrates an embodiment of a removable profile assembly having a reversible profile top in accordance with the present disclosure.
Figure 6B:
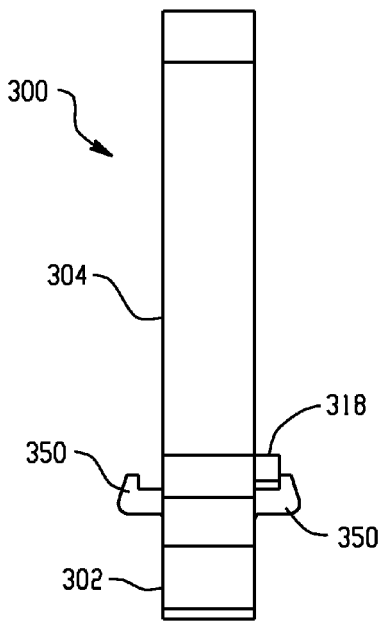
FIG. 6B schematically illustrates a side view of an embodiment of a removable profile assembly having a reversible profile top in accordance with the present disclosure.
Figure 7:
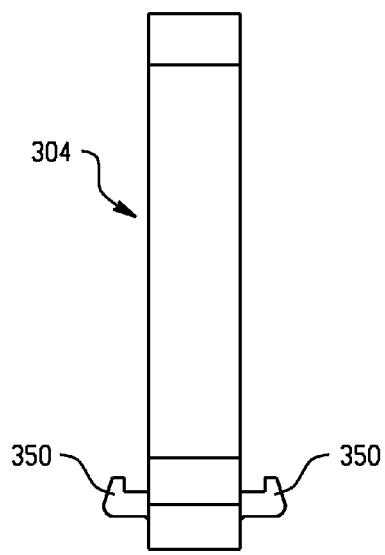
FIG. 7 schematically illustrates a side view of a reversible profile top of a removable profile assembly in accordance with the present disclosure.

In another embodiment as illustrated in FIGS. 6 and 7, the profile of profile assembly 300 can be configured to be reversible. That is, the same profile can be reversibly positioned as may be desired when one of the profile surfaces is worn, damaged, or the like. As shown, profile 304 is configured to have two protrusions 350 extending from the lower portion 302, wherein each protrusion 350 is disposed on opposite sides of the profile 304, i.e., 180 degrees relative to one another. As described above, the protrusions 350 extend beyond and are configured to physically engage the lip 318 of the base 302 in a similar manner. Depending on the profile surface to be used for conveying objects, a selected one of the protrusions 350 is oriented to pass through channel 316 of the base 302 and engage lip 318. For snap fit engagement, the protrusions have an "L-shape" for locking the profile top in position. A benefit of this embodiment is that the profile top 304 is reversible. When the profile assembly 300, particularly the profile top 304, experiences high wear on a first side, the profile 304 can be unsnapped from the base 302, reversed 180 degrees, and inserted back into the base 302 such that a second, opposite side of the profile top 304, previously unworn, is now in contact with the article to be conveyed. Not only does this provide advantages in system efficiency and downtime, but it also saves material costs as a single reversible profile assembly can last in operation longer than a non-reversible one. In one embodiment, the profile surfaces to be used for conveying objects are different. In other embodiments, the profile surfaces are identical.

This unique two-piece snap-fit design of the profile assembly 100 provides for a readily removable profile from the belt. When a profile is damaged, it is no longer necessary to shut down the conveyor system and remove the belt in order to provide a new profile. Moreover, it is not necessary to unscrew, unbolt, or otherwise disassemble the profile in order to remove it from the belt. This saves on downtime and manpower, as it is often difficult to get to the back of conveyor belts while they are in place. If the profile is simply worn from repeated use, but is not damaged beyond repair, the profile top can be removed from the base and swapped with a profile top from an opposite side of the conveyor. The unworn side of the profile top will be in physical communication with the product to be conveyed and the useful life of a single profile is extended.

The product intended to be conveyed by the profile assembly 100 will determine not just the shape of the profile top, but also the materials used to form the assembly, as well as the size of the assembly. For example, certain products require that the profile material have a specific grip or softness. Materials that are too hard can damage the conveyed product whereas if the profile material is too soft it may wear too quickly or have too much grip, thereby losing the ability to convey the product. Exemplary materials for the profile 104 are described above. The base 102 can be formed of the same material or a different material. In an exemplary embodiment, the entire profile assembly 100 is free of metal. In another exemplary embodiment, the profile assembly 100 material has a durometer of about 92 A. Moreover, the speed of the conveyor system, the size, weight and material of the product, will determine the base area of the profile assembly. The base area means the area that the base 102 of the profile assembly 100 occupies on the belt. Generally, a larger base area means the profile assembly 100 can withstand a greater force upon the profile 104. In an exemplary embodiment, the profile assembly 100 has a profile area welded to the base is capable of receiving at least 2000 pounds-force per square inch.

Figure 5:
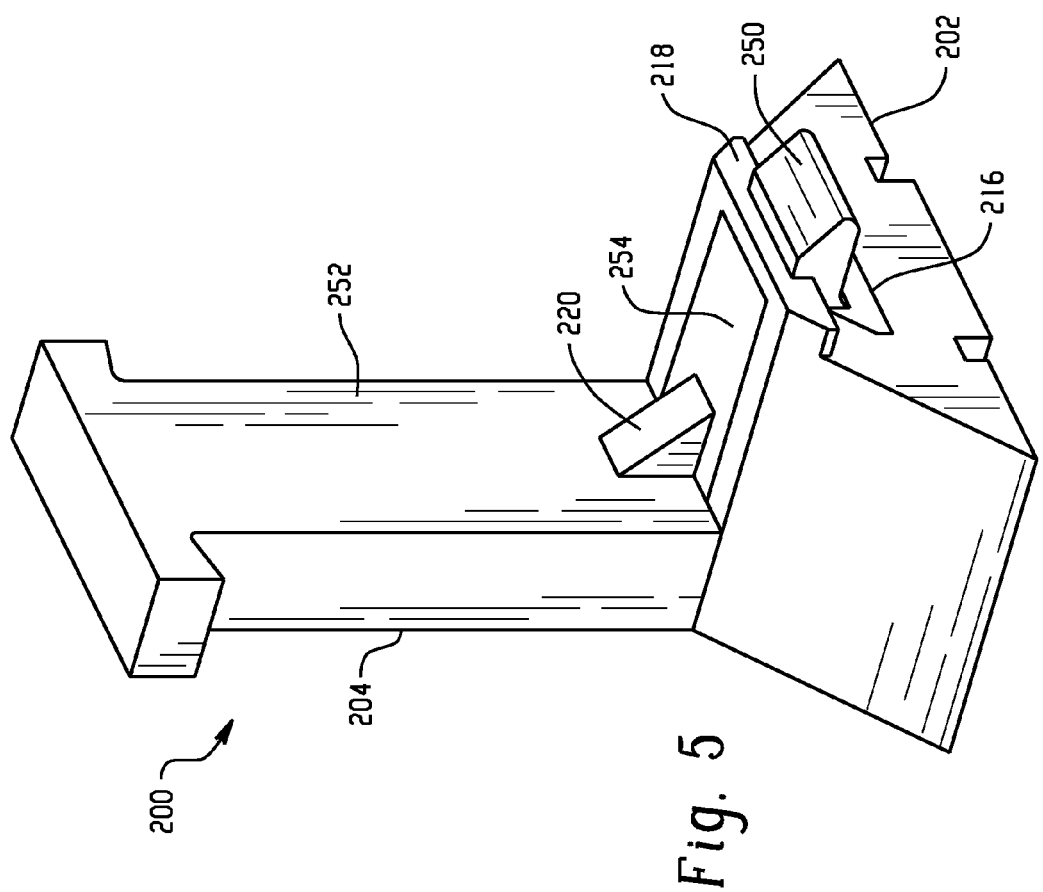
FIG. 5 schematically illustrates another embodiment of a removable profile assembly in accordance with the present disclosure.

FIG. 5 illustrates another exemplary embodiment of a profile assembly 200. The profile assembly 200 has a similar snap-fit two-piece construction as described above in FIGS. 1-4. The profile assembly 200 comprises a base 202 and a profile 204. The base 202, however, is much wider than the base 102 of the profile assembly 100 in FIG. 1. As described above, the reason for this is increasing the base area of the profile assembly 200. The wider (or longer) base 202 provides a larger base area of contact with the belt. This increase in base area provides for a large plastic weld between the base 202 and the belt (not shown). Generally, the profile assembly 200 would withstand a greater force without pulling apart from the belt than the profile assembly 100 having a smaller base area.

The profile assembly 200 comprises a similar snap-fit construction as described for the profile assembly 100. The base housing comprises a channel 216 and a lip 218 defining a sidewall opening in the housing, upon which a protrusion 250 engages during use. However, due to the dimensions of the base 202, the profile top 204 itself generally has an L-shape, rather than the generally straight shape of profile 104. While the upper portion 252 has a shape similar to that of profile assembly 100, the lower portion 154 extends out from the outer portion 252 in a generally perpendicular orientation thereto. The lower portion 254 is configured to extend and fully engage the significantly larger aperture 216 of the base 202. It is desirable to have the upper portion 252 disposed at an end of the base 202 opposite the lip 218, rather than being centrally located above the base 202. Because of this, the profile 204 further comprises a brace 220 disposed at the transition between the outer portion 252 and the inner portion 254. The brace 220 is configured to provide support to the upper portion 252 and is disposed on a side of the upper portion 252 opposite the conveyed product contact surface. In this embodiment, due to the generally ninety-degree angle between the upper portion 252 and lower portion 254, the brace has a generally triangular shape. In other embodiments, the brace 200 may have other shapes configured to support to the upper portion 252 of the profile top 204.

In operation, a desired number of profile assemblies are mounted onto a toothed belt and used to enable a conveyed object to be conveyed on the belt in a direction that the profile assemblies are moving. When the belt is rotated forward, the conveyed object is press-fed in the direction of the contact surface of the profile top. In particular, the upper portion of the profile top, at or just below the T-shape, is in physical communication with the conveyed object.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A profile assembly for use on a belt, comprising:
   a base configured to be attached to the belt, wherein the base comprises a housing comprising a channel formed in an upper surface, a lip at about a selected end of the housing defining a sidewall opening, and a bottom surface configured to be in physical communication with a surface of the belt; and
   a removable profile comprising an upper portion configured to be in physical communication with an object to be conveyed, and a lower portion configured to be inserted into the channel, wherein the lower portion comprises an outwardly extending first protrusion configured to snap fit with the base lip when the profile is inserted into the channel.

2. The profile assembly of claim 1, wherein the lower portion further comprises a second protrusion on a surface opposite the first protrusion.

3. The profile assembly of claim 1, wherein the base channel has a trapezoidal shape and the lower portion has a complementary shape.

4. The profile assembly of claim 1, wherein the protrusion has an L-shape.

5. The profile assembly of claim 4, wherein the L-shape is orientated to engage the lip.

6. The profile assembly of claim 1, wherein the upper portion has a T-shape.

7. The profile assembly of claim 1, wherein the profile has an L-shape and the lower portion has a length approximately equal to a length of the channel.

8. The profile assembly of claim 1, wherein the base is a thermoplastic.

9. A profile assembly for conveying an object, comprising:
   a base configured to be welded to an outside surface of a timing belt, wherein the base comprises a channel disposed in an upper surface, a lip disposed about one end of the channel to define a sidewall opening in the housing, and a bottom surface adapted for in physical communication with the outside surface of the timing belt; and
   a removable profile comprising an upper portion configured to be in physical communication with the object to be conveyed, and a lower portion configured to be inserted into the channel of the base housing, wherein the lower portion comprises a first and second protrusions extending therefrom on opposite surfaces, wherein a selected one of the first and second protrusions is configured to snap fit with the lip when the profile is inserted into the channel.

10. The profile assembly of claim 9, wherein the base has a trapezoidal shaped exterior.

11. The profile assembly of claim 9, wherein the lower portion of the profile and the channel have complementary shapes.

12. The profile assembly of claim 9, wherein the lower portion of the profile has a trapezoidal shape and the channel has a trapezoidal shaped opening configured to slidingly receive the lower portion of the profile.

13. The profile assembly of claim 9, wherein the protrusion has an L-shape.

14. The profile assembly of claim 13, wherein the L-shape is orientated to engage the lip.

15. The profile assembly of claim 9, wherein the upper portion of the profile has a T-shape.

16. The profile assembly of claim 9, wherein the base is formed of a thermoplastic.

17. The profile assembly of claim 9, wherein the base and the removable profile are formed of a thermoplastic.

18. A method of providing a profile assembly for a belt, comprising:
   providing a profile assembly comprising a base and a removable profile;
   plastic welding the base onto an outside surface of the belt, wherein the base comprises a lower portion configured to be in physical communication with a surface of the belt, and an upper portion comprising an aperture therein, and a lip disposed adjacent to the aperture on a side of the upper portion; and
   snap fitting the profile top into the base by inserting an inner portion of the profile top into the upper portion, wherein the inner portion comprises a protrusion extending from a surface of the inner portion, the protrusion configured to extend through the aperture and snap fit with the lip, and wherein the profile top comprises an outer portion configured to be in physical communication with an object to be conveyed.

19. The method of claim 16, further comprising removing the profile top from the base without removing the base from the belt.

20. The method of claim 16, wherein plastic welding comprises hot gas, heat seal, freehand, speed tip, contact, hot plate, high frequency, ultrasonic, friction, spin, laser, solvent, or combination of one or more of the plastic welding techniques.

* * * * *